United States Patent [19]
Craighead et al.

[11] 4,284,689
[45] Aug. 18, 1981

[54] LIGHT-ABSORBING MATERIALS

[75] Inventors: Harold G. Craighead, Eatontown; Richard E. Howard, Holmdel, both of N.J.

[73] Assignee: Bell Telephone Laboratories, Incorporated, Murray Hill, N.J.

[21] Appl. No.: 137,602

[22] Filed: Apr. 7, 1980

[51] Int. Cl.$^3$ .................. B32B 15/04; C23C 15/00; B32B 3/00
[52] U.S. Cl. .................................. 428/620; 126/901; 204/192 E; 428/141; 428/333; 428/612; 428/641; 428/642; 428/687; 428/913
[58] Field of Search .................. 204/192 E; 126/901; 428/333, 141, 612, 620, 641, 642, 687, 913

[56] References Cited

U.S. PATENT DOCUMENTS

| | | | |
|---|---|---|---|
| 3,846,294 | 11/1974 | Vossen | 204/192 |
| 4,160,045 | 7/1979 | Longshore | 427/38 |

OTHER PUBLICATIONS

C. M. Lampert et al., "Coatings For Enhanced Photothermal Energy Collection," *Solar Energy Materials*, vol. 1, pp. 319-341 (1979).
H. G. Craighead et al., "Metal/Insulator Composite Selective Absorbers," *Solar Energy Materials*, vol. 1, pp. 105-124 (1979).
J. I. Gittleman et al., "Textured Silicon: Selective Solar Absorber for Solar Thermal Conversion," *Appl. Phys. Lett.*, vol. 35, pp. 742-744 (1979).
G. D. Pettit et al., "Solar Absorbing Surfaces of Anodized Dendritic Tungsten," *IBM J. Res. Dev.*, vol. 22, pp. 372-377 (1978).
J. J. Cuomo et al., "A New Concept for Solar Energy Thermal Conversion," *Appl. Phys. Lett.*, vol. 26, pp. 557-559 (1975).
C. M. Lampert et al., "Microstructure & Optical Properties of Black Chrome Before & After Exposure to High Temperatures," *Proceedings Second Annual Conf. on Absorber Surfaces for Solar Receivers* Jan. 1979, pp. 19-30.

*Primary Examiner*—Aaron Weisstuch
*Attorney, Agent, or Firm*—Bruce S. Schneider

[57] ABSTRACT

Materials have been made that exhibit high absorption in the visible, near ultraviolet, and near infrared spectral region while simultaneously exhibiting low absorptivity in the thermal infrared. Exemplary of such materials is silicon which is etched in a reactive sputtering process in the presence of a sputterable material. Other materials exhibiting useful properties are produced by this method.

24 Claims, 5 Drawing Figures

LIGHT-ABSORBING MATERIALS

BACKGROUND OF THE INVENTION

1. Field of the Invention

This invention relates to light absorbing materials and, more particularly, to materials useful for absorbing solar energy.

2. Art Background

The collection of energy derived from solar radiation is an alluring prospect. One method contemplated for solar energy utilization is the production of heat through absorption of solar energy by an absorbing, i.e., black material, utilized in a solar collector. Collectors are typically fabricated by depositing an absorbing material on a substrate that is an efficient heat conductor. Solar energy is directed onto the absorber by an optical system. The heat produced by absorption is conducted through the substrate and is either exchanged with a heat transfer medium or used directly.

A variety of materials has been proposed as solar absorbers. (See C. M. Lambert, *Solar Energy Materials*, 1, 319 (1979).) Exemplary of these absorbing materials is electroplated black chrome (a complicated mixture of chrome and chrome oxides), an evaporated platinum-aluminum oxide mixture, and a dendritic tungsten material (described in *Solar Energy*, 17, 119 (1975), *Solar Energy Materials*, 1, 105 (1979), and *Applied Physics Letters*, 26, 557 (1975), respectively). Although each of these exemplary materials has desirable properties, each also has some limitations.

The use of solar concentrators (the focusing of solar radiation onto an absorbing material) has been contemplated to increase the efficiency of heat production and to yield higher temperatures for directly driving chemical reactions. Below 300 degrees C., the chrome mixture and the dendritic tungsten typically are useful. However, at increased temperatures both materials degrade. The chrome/chrome oxide compositions undergo decomposition induced by temperatures above 300 degrees C. The tungsten materials are stable in an inert atmosphere above 300 degrees C., but seriously degenerate at these temperatures in the presence of an oxidizing medium such as air. Thus, although most of the newer absorbing materials appear useful for solar energy absorption of one sun, at higher sun densities—temperatures experienced when solar concentration is employed—they exhibit significant problems. The platinum/aluminum oxide composite exhibits better stability, but is generally not useful above approximately 500 degrees C.

Beside the difficulties associated with solar concentration, many of the absorbing materials including those previously discussed have acceptable absorption efficiencies, but re-radiate a substantial portion of the absorbed energy. This re-radiation results in decreased solar conversion efficiency. Additionally, presently available materials, such as the evaporated platinum/aluminum oxide mixture, are expensive and severely limit the applications for which solar energy is economical.

SUMMARY OF THE INVENTION

Materials having solar absorptivity up to 85 percent with low thermal emissivity (low re-radiation in the thermal infrared, i.e., wavelengths longer than 2 $\mu$m) have been made. These materials rely on a particular channeled structure to produce the desired absorption. This channeled structure involves the production of voids having depths on the order of 0.4 $\mu$m or deeper and having substantially vertical walls. Generally, the preferred fabrication process to produce the desired channeled structure entails the formation of a specifically designed etch mask in conjunction with anisotropic etching. In a preferred embodiment, the materials of the subject invention are made by placing sample materials on a sputterable substrate, i.e., a body containing material such as aluminum that undergoes sputtering, and introducing an etchant gas that forms low melting compounds with the material sputtered from the substrate and which also anisotropically etches the sample material. For example, when the sample material is silicon, an appropriate gas is $CCl_2F_2$ and an appropriate substrate is aluminum. Using a semiconductor sample such as GaAs, Ge, or silicon, materials that have high absorptivity in the solar range between about 0.2 $\mu$m to 2.0 $\mu$m and high reflectivity in the thermal infrared i.e., wavelengths longer than about 2.0 $\mu$m, have been made. Since semiconductor grade material is not necessary, these materials are relatively inexpensive.

It is also possible to produce highly absorbing compositions from materials such as metals. However, these materials do radiate significantly in the infrared and, thus, although quite useful, are generally not as efficient as the corresponding semiconductor materials.

DETAILED DESCRIPTION

The highly absorbing materials of the subject invention result from the production of a specific structure in the absorbing material. This structure involves a channeled material, i.e., a material containing voids that intersect the surface of the material for example, voids that are arranged to form (1) an unconnected array, or (2) a reticulated structure, or (3) a combination of the two, where the walls of the voids in a localized area, i.e., in any area defined by a 10 $\mu$m on a side square, are either parallel to each other or no more than 20 degrees, preferably no more than 10 degrees, from the mean wall direction where the wall direction is determined by an imaginary tangent drawn at an intermediate point of the void wall. To determine the intermediate points on a wall within a localized area, an averaging procedure is utilized. (This procedure is done separately for each localized area.) First a plane is drawn intersecting the surface of the material in a portion where the voids emerge, 8 in FIG. 2, and also intersecting the region of the material below the channeled portion, 10. This intersection determines a curve, 11. A least square fit line, 13, to this curve is then drawn. This procedure is repeated for different intersecting planes to yield a number of least-square-derived lines. The least square plane to this series of lines within the localized area is then ascertained. (Obviously, the larger the number of lines used for this least square process the closer the fit. However, generally 10 to 20 lines yield accuracy within experimented error.) The points at which the plane thus determined cuts a wall of a void are the intermediate points for purposes of the angle measurement. It might be noted that this procedure in the case of a relatively flat material seems cumbersome. However, the subject invention also encompasses the presence of rough surfaces and curved surfaces such as spheres or tubes where the concepts of direction and distance are more complex and where this procedure is necessary to avoid ambiguities.

Figure 1:
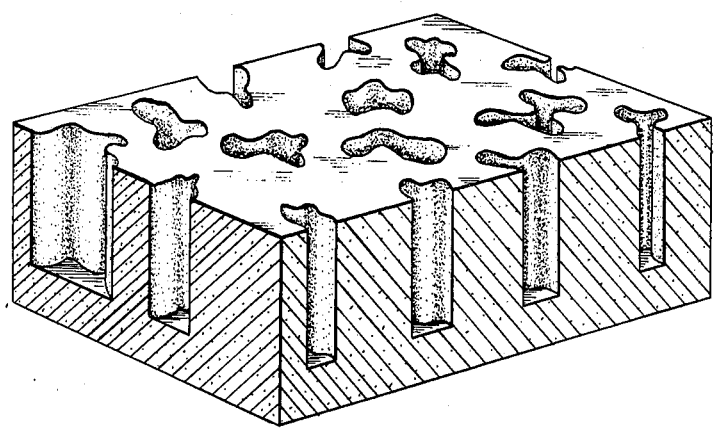
FIGS. 1-3 illustrate materials within the subject invention.
Figure 2:
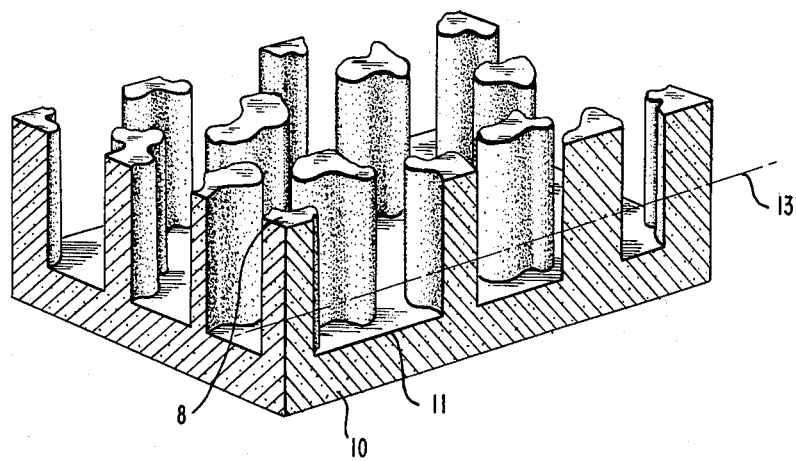
Figure 3:
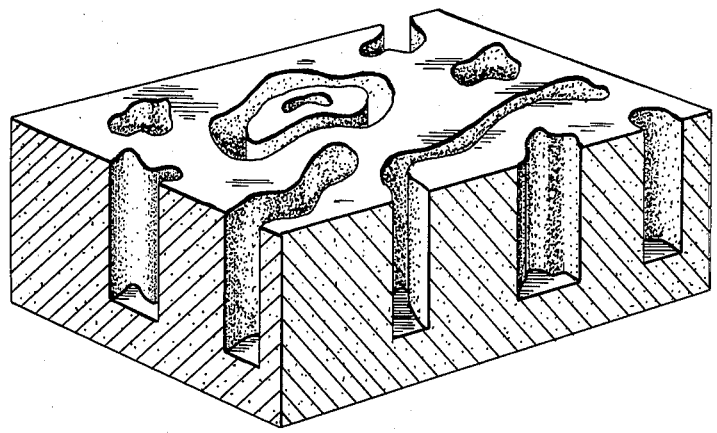

Some deviation from the angle requirement in some of the walls of the voids is obviously acceptable without substantially affecting the material absorption properties. Generally, it is sufficient for purposes of the invention if the desired wall direction requirement within any given localized area is substantially present, i.e., the wall direction is within the necessary 20 degree requirement over at least 75 percent of the wall length—the distance along the lines produced by connecting the defined intermediate points along the wall. (Although a random configuration of voids is preferred, symmetrical configurations are not precluded.) Examples of the general appearance for a discrete array, a reticulated structure, and a combination are shown in FIGS. 1, 2, and 3 respectively.

A substantial factor affecting absorption is the large change of refractive index at the absorbing material/atmosphere interface. To mitigate the losses due to the reflectivity produced by this large refractive index change, channels that decrease the size of this refractive index change are used. This decrease in refractive index change is most advantageously accomplished with channels that have cross-sectional dimensions smaller than the wavelength of the incident light. (It is understood that incident light is composed of a plurality of wavelengths each at different intensities. For purposes of this invention, the wavelength for this spectrum is considered the light of shortest wavelength that composes at least 0.1 percent of the total intensity of the incident light.) Larger cross-sectional dimensions up to ten times greater still significantly reduce absorption and are not precluded. For example for solar radiation (air mass 2) the most advantageous channel size is less than 0.3 $\mu$m, but channel sizes of less than 3 $\mu$m preferably less than 1 $\mu$m increase absorption and are contemplated within the invention. If the channel size criterion is satisfied, the incoming radiation encounters an average refractive index difference at the atmosphere/absorbing material interface which is smaller than would be experienced if the channels had not been present. (It should be noted that the refractive index of metals and materials such as semiconductors are different. Thus, the optimum channel cross-section and depth for these materials are somewhat different. However, channels within the given range yield excellent results and a controlled sample is used to determine the best values for a given material.)

The channel cross-sectional dimension—the channel size—for purposes of the invention is the size obtained by drawing a line at random along the least-squares-plane that determines the intermediate points on the walls of the voids in a localized area, measuring the distance along this line across each void, and calculating the mean value for these void distances.

The depth of the channels and the density of the channels also significantly affect the average refractive index difference and, thus, the extent of reflectivity. The mean channel depth should be approximately equivalent to or deeper than the wavelength of incident radiation. General channels deeper than 0.4 $\mu$m preferably deeper than 0.8 $\mu$m are desirable. However, channels deeper than 5 $\mu$m, although not precluded, are generally not advantageous since structural instability occurs. (The void depth is the vertical distance between the void bottom and the void opening measured perpendicular to the plane in a localized area defining the intermediate points.) It is also advantageous to have a large channel density so that the effective refractive index difference is smaller and, thus, the amount of reflected light is correspondingly smaller. Generally, channel densities, i.e., the fractional volume of voids in the total volume of the channeled region measured to the mean depth, in the range 20 percent to 80 percent are utilized. (Channel densities are given as fractional volumes of the channeled region since it is possible to make a material where only a portion of the material is channeled.) If the channel density becomes too large the amount of material in a given area becomes undesirably low and, therefore, the amount of material available to absorb light is significantly diminished. For this reason, channel densities greater than 80 percent are usually not desirable.

It is advantageous to use a semiconductor material that has an optical absorption edge in the range 1 to 2 $\mu$m. (The optical absorption edge is the wavelength at which a sharp change in absorption occurs.) For crystalline semiconductor materials, this corresponds to a semiconductor having a bandgap in the range 1.2 to 0.6 eV. These semiconductor materials advantageously have relatively low absorption cross-section for infrared radiation. Thus, the emission of infrared radiation is correspondingly low. However, light having an energy greater than the bandgap is efficiently absorbed. Through various decay processes within the semiconductor material the absorbed energy is transferred to states within the semiconductor material that induce heating in the material. Because the absorption of infrared radiation in semiconductor materials within the preferred embodiment is low, the emission of light at these frequencies is similarly low and, thus, heat is not dissipated by the emission of infrared light. Thus, the semiconductor material efficiently absorbs light, efficiently changes this light to heat energy, and does not dissipate this heat energy in the form of re-emitted infrared light.

The extent of absorption also depends on the thickness of the absorbing material. Generally for a semiconductor material with an appropriate bandgap, incident ultraviolet, visible and near-infrared radiation is absorbed within 1 $\mu$m of the surface. Thicknesses significantly greater than this thickness as a result do not substantially increase absorption of usable radiation, but do increase the absorption (and thus emission) of thermal infrared radiation. Therefore, it is advantageous to limit the thickness of the semiconductor material to less than 5 $\mu$m. Similarly, if a backing material for the absorbing material is used, it also affects thermal infrared emission. For example, if the backing has a metal surface, especially a highly polished metal surface, adjoining the absorbing material infrared light will be efficiently reflected and equally effectively prevent re-emission. Thus, the backing material will not contribute to heat loss through re-emission.

Silicon is particularly advantageous for the structures of the subject invention. This material is abundant. Additionally, semiconductor grade material is not required and, therefore, it is possible to fabricate a relatively inexpensive absorber. Typical of other semiconductor materials exhibiting a high degree of absorption when having the previously specified channel are GaAs and Ge.

Materials such as small bandgap semiconductor materials with absorption edges lower than 2 $\mu$m, and metals, readily absorb in the infrared irrespective of their thickness. Therefore, their emission in the infrared is also substantial. As a result, these materials do not have the advantage of readily producing heat without substantial re-emission of infrared light. Nevertheless, metallic or small bandgap semiconductor materials having channels as described above exhibit relatively high absorptivity and are contemplated within the subject invention.

Materials having a discrete absorption spectrum which fall outside the metallic or semiconductor class are not precluded. The absorption of light falling within the discrete absorption spectrum of these materials is possible. The channels produced in these materials should be of the size previously discussed.

The channeled materials of the subject invention are advantageously produced by anisotropic etching, i.e., an etch process that removes material in the direction perpendicular to the surface at a rate of at least twice as fast as the removal rate parallel to the surface, and that is capable of maintaining these rates to a depth of at least 0.4 $\mu$m, preferably to at least 0.8 $\mu$m. (The removal rates are determined using an essentially flat control sample. A compendium of anisotropic etchants for a variety of materials is found in H. W. Lehmann and R. Widmer, *Journal of Vacuum Science Technology*, 15, 319 (1978).) During the anisotropic etching the sample is masked in a pattern that produces the desired void dimensions and densities with a material whose entire thickness is not removed in the etching process.

In the preferred etching procedure, the etch mask is formed in situ during the etching process. This is accomplished, for example, by etching in an environment capable of producing sputtering, i.e., an environment which results in a measurable sputter yield, (see *Handbook of Thin Film Technology*, L. I. Maissel and R. Glang, McGraw Hill, N.Y. (1970) pages 3-15 for a suitable method of determining sputter yield), and placing the material to be etched, i.e., the sample material, on or in close proximity to a large area of sputterable substrate so that at least a portion of the substrate is exposed. (A sputterable substrate denotes a composition having a measurable sputter yield when used with the chosen anisotropic etching procedure.) In a preferred embodiment a reactive gas introduced in a plasma etching procedure is chosen to anisotropically etch the sample material and, at the same time, form compounds with the substrate material.

In practice, in the preferred embodiment once the plasma is struck, etching begins on the sample and, at the same time, the plasma produces sputtering from the substrate surface. Some of the sputtered substrate is redeposited onto the sample. The sputterable substrate is chosen so that the redeposited material then reacts with the gases present to form a composition with low vapor pressure. (Alternatively, the sputtered material could react in the gas phase and condense on the surface of the sample or the sputtered material alone could be inert to the environment but have appropriate properties to produce the desired results. The exact sequence is unimportant.) A low vapor pressure, e.g., on the order of $10^{-7}$ Torr, is required for the mask material thus formed to allow sufficient quantities of the composition to accumulate on the sample surface.

The composition agglomerates on the surface of the sample and acts as a reactive etching mask. The agglomerations prevent etching of portions of the sample and result in the formation of channels. Exemplary of contemplated mask materials are compounds produced by the interaction of substrates such as aluminum, magnesium, and stainless steel with chlorine yielded by a chlorine-containing gas such as $CCl_2F_2$.

The plasma should be produced under conditions which are conductive to the production of the desired mask on the sample material—that is in an atmosphere having particles with sufficient energy to induce sputtering. Generally plasmas produced using a power density in the range 0.2 to 2.5 watts/cm$^2$ are appropriate. The pressure of the etchant must be sufficient to produce anisotropic etching in the sample. Generally for isotropic etchants pressures in the range 2 $\mu$m to 40 $\mu$m are utilized. Each etchant composition produces a species which actually induces the etching. For example, $CCl_2F_2$ produces chlorine and fluorine which etch silicon. It is possible to use the etchant composition alone, or in combination with other components. For example, it is possible to add inert gases, such as argon or helium, to stabilize a plasma, or to add a material to enhance production of the actual etching specie. Generally, the etching composition should be 5 to 100 percent of the total etchant.

The depth and channel dimension are controllable by varying the pressure of the etchant composition, the power density, and the etch time. The particular combination necessary to produce a desired channel depth and cross-sectional dimension in a given material is determined by using a control sample. For example, when an aluminum substrate and a silicon sample are utilized, a total gas pressure in the range 5 to 40 $\mu$m, with an etchant composed of equal parts of $O_2$, Ar, and $CCl_2F_2$ produces a channel depth in the range 300 Angstroms to 2 $\mu$m and cross-sectional dimension in the range 500 Angstroms to 5000 Angstroms. At these pressures, a stable plasma is maintainable utilizing a power in the range 0.2 W/cm$^2$ to 2.5 W/cm$^2$. Although adequate etching is produced utilizing the etching composition, e.g., $CCl_2F_2$, alone, faster etching and more stable plasmas result when this etchant is combined with an inert gas such as Ar and with $O_2$. In a preferred embodiment, the use of oxygen with $CCl_2F_2$ at a ratio in the range 1:10 to 1:1 has been found to somewhat increase the degree of anisotropic etching and the addition of argon at a ratio of Ar to $CCl_2F_2$ in the range 1:10 to 1:1 produces a more stable plasma when $CCl_2 F_2$ comprises at least 8 percent of the total gas pressure.

The temperature of the sample at its surface also affects the channel dimensions. Generally, it is not possible to monitor this temperature. Nevertheless, the temperature is adjustable. For example, it is possible to insulate or heat sink the sample and affect the temperature. When heat sinking or insulation is utilized with a $CCl_2F_2/Ar/O_2$ mixture, cross-sectional dimensions were altered from about 2000 Angstroms for the former to about 4000 Angstroms for the latter under the same processing conditions. The effect of a particular temperature-control-measure is determined by a controlled sample.

In a preferred embodiment thin films on a supporting substrate are treated by the in situ formation of an etchant mask. However, thick samples, e.g., thicknesses greater than 2 μm, are also suitable for treatment to produce the desired channels. Additionally, it is also possible to produce a suitable mask by depositing the mask before the etch procedure is initiated. This is done, for example, on silicon by evaporating lead to a thickness in the range 500 Angstroms to 1500 Angstroms at temperatures in the range 25 degrees C. to 100 degrees C.

The following example is illustrative of suitable parameters used in the production of highly absorbing materials within the subject invention:

EXAMPLE 1

A silicon substrate measuring 1 inch×0.5 inch×0.020 inch having one polished side with a local smoothness finer than 100 Angstroms was cleaned by immersing it in a hot water/detergent solution. The solution was ultrasonically agitated for approximately 10 minutes. The substrate was then removed from the detergent solution and sequentially rinsed in hot water followed by deionized water. The substrate was then scrubbed with a lint-free foam swab in deionized water. To remove the water, the substrate was treated in a vapor degreaser with isopropyl alcohol vapor.

The substrate was placed in an ion pumped vacuum station. The substrate was positioned approximately 5 inches above a multicrucible 3 kW electron beam evaporation source. A layer of about 1400 Angstroms of tungsten was deposited on the substrate by energizing the crucible containing an approximately $\frac{1}{8}$ cm$^3$ piece of tungsten. The thickness during the deposition was measured and monitored by using a standard quartz crystal film thickness measuring device. During the tungsten deposition, the vacuum pressure was maintained in the $10^{-6}$ Torr range by employing in addition to the ion pumps a titanium sublimation pump and a liquid nitrogen-cooled panel. The tungsten was deposited at a rate of about 12 Angstroms per second.

Following the tungsten deposition a layer of silicon about 2.2 μm thick was deposited in a similar manner at a rate of about 20 Angstroms per second. In this case, however, the entire thickness of the film was deposited in three layers with a waiting period of at least one-half hour between evaporations. This was done to prevent overheating of the substrate and the vacuum system fixtures. The pressure in the vacuum system varied from about $1\times10^{-8}$ to $4\times10^{-7}$ Torr during the silicon deposition. After cooling to about 40 degrees C. the silicon coated substrate was removed from the deposition system for subsequent etching.

The reactive ion etching process was done using a conventional diode sputtering system. The system used an oil diffusion pump with an optically dense water-cooled baffle. The plasma was generated by a 13.56 MHz rf generator connected to two parallel, water-cooled electrodes 5 inches in diameter. The rf matching network on the sputtering system was tuned to supply all of the power to the electrode on which the samples were to be etched. The electrode on which the samples were etched was covered with a 5 inch diameter aluminum plate which was thermal interconnected to the water-cooled electrode. The second electrode was fused quartz.

The flow of the reactive gases through the sputtering systems was controlled using both pressure and flow-ratio servo systems. A capacitance manometer was used to monitor the pressure. The signal from this manometer was used to adjust the flow of $CCl_2F_2$. (This may be designated as the main gas.) The flow of the other two gases $O_2$ and Ar was controlled by a flow/ratio controller. By this means, either the flow of the secondary gases or the ratio of their flow to the main gas flow could be held constant. The flow rate of all the gases was monitored using a thermal mass flowmeter with a 100 standard cubic centimeter per minute (SCCM) full scale sensitivity. The gases were mixed in an external manifold before entering the station. The manifold was heated to approximately 48 degrees C. to reduce adsorption of gases on the walls.

The cleaned silicon sample was placed in the center of the aluminum plate with the deposited silicon upward and the system was pumped down to a pressure of less than 1 μm. Argon, $CCl_2F_2$, and oxygen were fed into the chamber at equal rates of 3.7 SCCM using the flow control system described above. (It should be noted that equal rates are not equivalent to equal mole fraction and that relative pumping speeds of gases determine the actual mole fraction in the plasma.) The total pressure in the chamber was controlled to be 20 μm. The rf power was turned on to 70 W total giving a self bias of $-540$ V on the aluminum plate. The power was applied for a total of 9 minutes.

Figure 4:
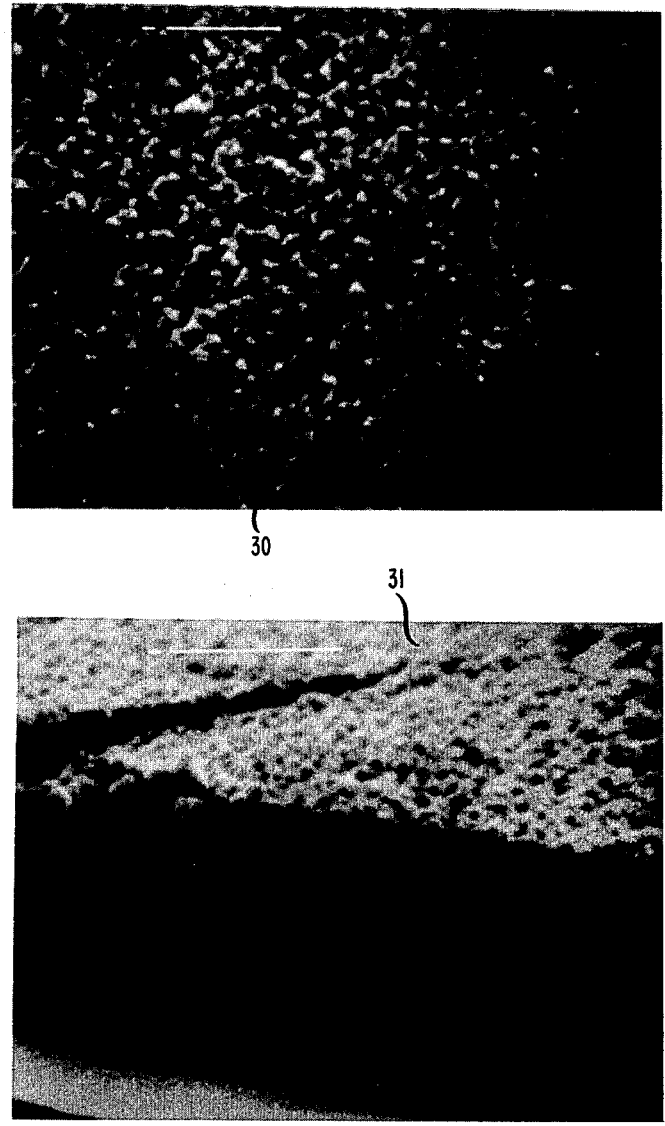
FIG. 4 shows micrographs of a material within the subject invention.

The surface of the Si film, as observed by use of a scanning electron microscope, has a columnar etch pattern. (Electron micrographs are shown in FIG. 4, a micrograph at 45 degrees indicated 30 and a micrograph of a cleaved edge taken at an angle of 70 degrees indicated by 31.) The voids on the silicon have channel dimensions of about 1000 Angstroms. The vertical depth was about 5000 Angstroms.

Figure 5:
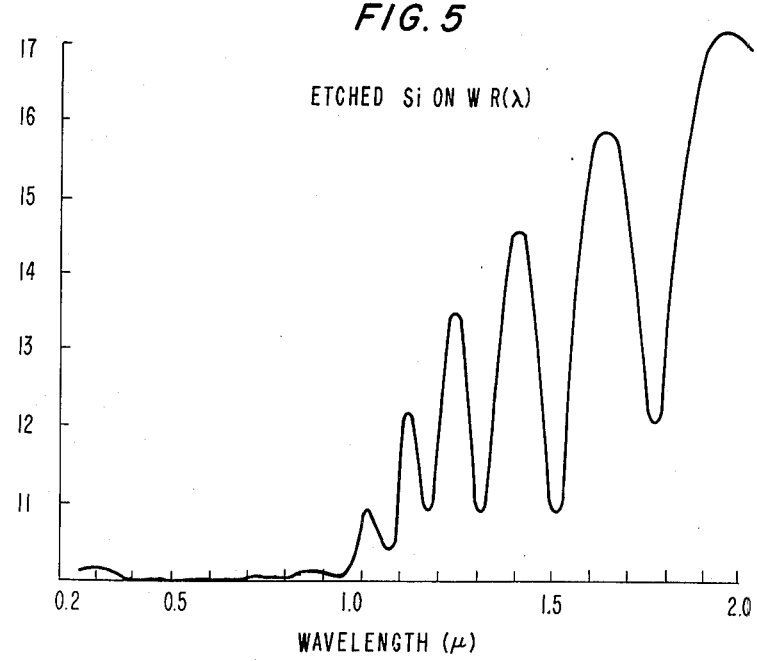
FIG. 5 is a graph demonstrating optical properties that are achievable.

The appearance of this absorbing film to the unaided eye is dark black. The specular reflectivity was measured using a commercial reflectivity attachment with a dual beam spectrophotometer. From this measured reflectance, FIG. 5, the absorptance over the visible spectrum, i.e., the wavelength range of 0.4 μm to 0.7 μm is greater than 99.5 percent. The solar absorptance, i.e., the weighted average of the films' absorptivity over the solar spectrum is greater than 85 percent.

This process demonstrates the various parameters used in a preferred embodiment of the invention to produce an excellent solar absorber. The silicon substrate was used as a supporting layer. This substrate was sequentially coated with a reflective metal and a silicon layer. The reflective metal was used to enhance absorption in the overlying silicon layer. This overlying silicon layer was then channeled to produce the excellent inventive absorbers. To accomplish the desired channeling, the silicon substrate was placed on an aluminum plate. The interaction of the aluminum with the etchant, i.e., $CCl_2F_2$ produced the desired in situ mask. The $CCl_2F_2$ in addition to forming the in situ mask also produces the desired anisotropic etching of the underlying silicon.

We claim:

1. A body with a channeled portion comprising a material forming said body that contains a multiplicity of open voids where the mean depth of said voids is at least 0.3 μm, where 20 to 80 percent of the volume of said channeled portion measured to said mean depth consists of voids, where the channel dimension of said voids is less than 3 μm and where the wall direction over 75 percent of the wall length within any localized area defined by a square 10 μm on side is within 20 degrees of the mean direction for said walls within said localized area.

2. The body of claim 1 wherein said material comprises a semiconductor.

3. The body of claim 2 wherein said material comprises silicon.

4. The body of claim 2 wherein said material is chosen from the group consisting of Ge and GaAs.

5. The body of claim 1 wherein said wall direction is within 10 degrees of said mean wall direction.

6. The body of claims 1, 2, 3, or 4 wherein said channel dimension of said voids is less than 1 μm.

7. The body of claim 1 wherein said structure comprises discrete holes.

8. The body of claim 1 wherein said structure comprises reticulations.

9. The body of claim 1 wherein said structure comprises a combination of discrete holes and reticulations.

10. The body of claim 1 including a metal surface in intimate contact with said material.

11. A process for fabrication of a body having voids comprising the steps of bringing a material into close proximity to a sputterable composition such that at least a portion of said sputterable composition is exposed, and sputtering from said sputterable composition to form in situ a mask on said material while anisotropically etching said material.

12. The process of claim 11 wherein said material comprises a semiconductor.

13. The process of claim 12 wherein said material comprises a member chosen from the group consisting of silicon, Ge and GaAs.

14. The process of either claim 11, 12, or 13 wherein said etching is produced using an environment comprising $CCl_2F_2$.

15. The process of claim 14 wherein said etching is produced using an environment comprising a mixture of $O_2$, $CCl_2F_2$, and an inert gas.

16. The process of claim 15 wherein said inert gas is chosen from the group consisting of argon and helium.

17. The process of claim 11 wherein said sputterable material comprises a material chosen from the group consisting of aluminum, magnesium, and stainless steel.

18. A product formed by the process comprising the steps of bringing a material into close proximity to a sputterable composition such that at least a portion of said sputterable composition is exposed, and sputtering from said sputterable composition to form in situ a mask on said material while anisotropically etching said material.

19. The product of claim 18 wherein said material comprises a semiconductor.

20. The product of claim 19 wherein said material comprises a member chosen from the group consisting of silicon, Ge and GaAs.

21. The product of either claim 18, 19, or 20 wherein said etching is produced using an environment comprising $CCl_2F_2$.

22. The product of claim 21 wherein said etching is produced using an environment comprising a mixture of $O_2$, $CCl_2F_2$, and an inert gas.

23. The product of claim 22 wherein said inert gas is chosen from the group consisting of argon and helium.

24. The product of claim 18 wherein said sputterable material comprises a material chosen from the group consisting of aluminum, magnesium, and stainless steel.

* * * * *